(12) United States Patent
Isahaya et al.

(10) Patent No.: US 8,674,053 B2
(45) Date of Patent: Mar. 18, 2014

(54) PROCESS FOR PRODUCTION OF HIGHLY POLYMERIZED AROMATIC POLYCARBONATE RESIN

(75) Inventors: Yoshinori Isahaya, Tokyo (JP); Shu Yoshida, Tokyo (JP); Noriyuki Kato, Tokyo (JP); Hiroki Furuhashi, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/510,780

(22) PCT Filed: Nov. 18, 2010

(86) PCT No.: PCT/JP2010/070560
§ 371 (c)(1),
(2), (4) Date: Dec. 6, 2012

(87) PCT Pub. No.: WO2011/062220
PCT Pub. Date: May 26, 2011

(65) Prior Publication Data
US 2013/0197166 A1      Aug. 1, 2013

(30) Foreign Application Priority Data

Nov. 20, 2009   (JP) ................. 2009-265760

(51) Int. Cl.
  *C08G 64/00*      (2006.01)
  *C08G 63/02*      (2006.01)
(52) U.S. Cl.
  USPC .................................. 528/196; 528/198
(58) Field of Classification Search
  USPC .................................. 528/196, 198
  See application file for complete search history.

(56) References Cited

U.S. PATENT DOCUMENTS

| | | | |
|---|---|---|---|
| 5,521,275 | A | 5/1996 | McCloskey et al. |
| 5,696,222 | A | 12/1997 | Kaneko et al. |
| 5,703,196 | A | 12/1997 | Funakoshi et al. |
| 6,399,738 | B1 | 6/2002 | Ito |

FOREIGN PATENT DOCUMENTS

| | | |
|---|---|---|
| EP | 0 595 608 | 7/1997 |
| JP | 50-19600 | 7/1975 |
| JP | 6-94501 | 7/1986 |
| JP | 2-153923 | 6/1990 |
| JP | 4-153218 | 5/1992 |
| JP | 5-287070 | 11/1993 |
| JP | 2000-281769 | 10/2000 |
| JP | 2008-514754 | 5/2008 |
| JP | 4-112979 | 7/2008 |
| JP | 2009-102536 | 5/2009 |
| JP | 4-286914 | 7/2009 |
| WO | 95/27749 | 10/1995 |

OTHER PUBLICATIONS

Search report from International Application No. PCT/JP2010/070560, mail date is Feb. 22, 2011.

*Primary Examiner* — Terressa Boykin
(74) *Attorney, Agent, or Firm* — Greenblum & Bernstein, P.L.C.

(57) ABSTRACT

A method for highly polymerizing an aromatic polycarbonate resin, which enables the increase in molecular weight of the aromatic polycarbonate resin satisfactorily while keeping good quality of the resin. An aromatic polycarbonate is linked to an aliphatic diol compound having a boiling point of 240° C. or higher (preferably in an amount of 0.01 to 1.0 mole per mole of the total amount of the terminal of the aromatic polycarbonate) through a transesterification reaction in the presence of a transesterification catalyst under reduced pressure conditions (preferably at a reduced pressure ranging from 13 kPaA (100 torr) to 0.01 kPaA (0.01 torr)), thereby increasing the molecular weight of the resulting molecule. The weight average molecular weight (Mw) of the aromatic polycarbonate after the transesterification reaction can be increased preferably by 5,000 or more compared to that of the aromatic polycarbonate before the transesterification reaction.

16 Claims, No Drawings ized aromatic polycarbonate resin. More precisely, the present invention relates to a process for producing a polycarbonate resin with high quality and a high degree of polymerization wherein Mw is approximately 30,000-100,000, by chain extension by linking the end-capped terminal groups of aromatic polycarbonate with an aliphatic diol compound.

PROCESS FOR PRODUCTION OF HIGHLY POLYMERIZED AROMATIC POLYCARBONATE RESIN

TECHNICAL FIELD

The present invention relates to a method for highly polymerizing an aromatic polycarbonate resin. More precisely, the present invention relates to a process for producing a polycarbonate resin with high quality and a high degree of polymerization wherein Mw is approximately 30,000-100,000, by chain extension by linking the end-capped terminal groups of aromatic polycarbonate with an aliphatic diol compound.

BACKGROUND ART

Since polycarbonate is excellent in heat resistance, impact resistance and transparency, it has been widely used in many fields in recent years. Various studies have been carried out with processes for production of polycarbonate. Among them, polycarbonate derived from aromatic dihydroxy compounds such as 2,2-bis(4-hydroxyphenyl)propane, hereinafter "bisphenol A", is industrialized by both processes of interfacial polymerization and melt polymerization.

According to the interfacial polymerization, polycarbonate is produced from bisphenol A and phosgene, but toxic phosgene has to be used. In addition, it remains a problem such as corrosion of equipments caused by by-products such as hydrogen chloride and sodium chloride and chlorine-containing compounds such as methylene chloride used in great quantities as a solvent, and difficulties in removal of impurities such as sodium chloride or residual methylene chloride which might have an influence on polymer properties.

Meanwhile, as a method for producing polycarbonate from an aromatic dihydroxy compound and diarylcarbonates, a melt-polymerization method has been long known, wherein, for example, bisphenol A and diphenylcarbonate are polymerized through a transesterification reaction under melting conditions as removing by-product aromatic monohydroxy compounds. Unlike the interfacial polymerization method, the melt-polymerization method has advantages such as not using solvents. However, it has an essential problem as follows: As the polymerization proceeds, viscosity of polymer in the system increases drastically to make it difficult to remove by-product aromatic monohydroxy compounds efficiently out of the system which would cause the reaction rate extremely decrease to make it difficult to increase the polymerization degree.

In order to solve the above problem, various attempts have been studied to extract aromatic monohydroxy compounds from polymer under conditions of high viscosity. For example, Patent Document 1 (Japanese Patent Kokoku No. S50-19600) discloses a screw-type polymerization vessel having a vent. Further, Patent Document 2 (Japanese Patent Kokai No. H02-153923) discloses a method using a thin-film evaporator in combination with a horizontal polymerization device.

Patent Document 3 (U.S. Pat. No. 5,521,275) discloses a method for redistribution of molecular weight of an aromatic polycarbonate under the presence of a catalyst using an extruder having a polymer seal and a vent under reduced pressure.

However, the methods disclosed in the above documents would not be able to increase the molecular weight of polycarbonate sufficiently. The above methods for increasing the molecular weight using catalyst in large quantity or using strict conditions such as applying a high shearing might cause problems which would have a significant influence to polymer such as the deterioration in hue or the progress of a cross-linking reaction.

It is known that the polymerization degree of polycarbonate can be increased by adding a polymerization accelerator in the reaction system of melt-polymerization. Increasing the molecular weight under a short reaction residence time and a low reaction temperature enables to increase the production volumes of polycarbonate which would make it easy to design simple and inexpensive reaction vessels.

Patent Document 4 (European Patent No. 0 595 608) discloses a method for reacting several diarylcarbonates at the time of redistribution which, however, would not bring a significant increase in molecular weight. Patent Document 5 (U.S. Pat. No. 5,696,222) discloses a method for producing a highly polymerized polycarbonate by adding a certain type of polymerization accelerator such as arylester compounds of carbonic acid and dicarboxylic acid including bis(2-methoxyphenyl)carbonate, bis(2-ethoxyphenyl)carbonate, bis(2-chlorophenyl)carbonate, bis(2-methoxyphenyl)terephthalate and bis(2-methoxyphenyl)adipate.

Patent Document 6 (Japanese Patent No. 4,112,979) discloses a method of reacting several salicylic carbonates with an aromatic polycarbonate in order to increase the molecular weight thereof.

Patent Document 7 (Japanese Unexamined Patent Application Publication (Translation of PCT Application) No. 2008-514754) discloses a method of introducing polycarbonate oligomer and bis-salicylic carbonate or the like into an extruder to increase in molecular weight.

Patent Document 8 (Japanese Patent No. 4286914) discloses a method of increasing the amount of terminal hydroxy groups by an active hydrogen compound such as a dihydroxy compound and subsequently to carry out a coupling reaction of the aromatic polycarbonate having the increased amount of terminal hydroxy groups using a salicylic acid ester derivative.

However, the method disclosed in the above document requiring the amount of terminal hydroxy groups of polycarbonate is complicated in processes because it needs both a reaction process with an active hydrogen compound and a reaction process with a salicylic acid ester derivative. In addition, according to the method, polycarbonate having many terminal hydroxy groups is low in thermal stability and has a risk of deterioration in physical properties. As shown in Non-Patent Documents 1-2, the increase in the amount of hydroxy groups by active hydrogen compounds might induce a partial chain-decoupling reaction accompanied by widening of the molecular weight distribution. Furthermore, relatively large amount of catalyst is required to obtain a sufficiently high reaction rate, which might bring about deterioration in physical properties at the time of forming processes.

Patent Document 9 (Japanese Patent Kokoku No. H06-94501) discloses a process for producing a high-molecular polycarbonate by introducing 1,4-cyclohexanediol. According to the method disclosed therein, however, 1,4-cyclohexanediol is introduced together with an aromatic dihydroxy compound into the polycondensation reaction system from the beginning and therefore, 1,4-cyclohexanediol would be consumed first by the polycarbonate bond-forming reaction to form an oligomer, and then the aromatic dihydroxy compound would be reacted to participate the highly polymerization reaction. For this reason, it has a such defect that the reaction time would become relatively long, which might cause the deterioration of appearance features such as the color or hue.

Patent Document 10 (Japanese Patent Kokai No. 2009-102536) discloses a process for producing polycarbonate by copolymerizing specific aliphatic diol and etherdiol. However, since the polycarbonate disclosed therein has an isosorbide skeleton as a main structure, excellent impact resistance required to aromatic polycarbonates would not be exhibited.

As mentioned above, the conventional methods for producing highly polymerized aromatic polycarbonate have many problems, and still there are requests for developing an improved production method which enables the increase in molecular weight of the aromatic polycarbonate resin satisfactorily while keeping good quality that the polycarbonate originally has.

PRIOR ART DOCUMENTS

Patent Document

Patent Document 1: Jpn. Pat. Kokoku No. S50-19600
Patent Document 2: Jpn. Pat. Kokai No. H02-153923
Patent Document 3: U.S. Pat. No. 5,521,275
Patent Document 4: European Pat. No. 0 595 608
Patent Document 5: U.S. Pat. No. 5,696,222
Patent Document 6: Jpn. Pat. No. 4112979
Patent Document 7: Jpn. Unexamined Pat. Appl. Publication (Translation of PCT Application) No. 2008-514754
Patent Document 8: Jpn. Pat. No. 4286914
Patent Document 9: Jpn. Pat. Kokoku No. H06-94501
Patent Document 10: Jpn. Pat. Kokai No. 2009-102536

Non-Patent Document

Non-Patent Document 1: "Polycarbonate Handbook", published by Nikkan Kogyo Shimbun Ltd., p. 344
Non-Patent Document 2: "Polycarbonate Resin" published by Nikkan Kogyo Shimbun Ltd. "Plastic Material" p. 144

DISCLOSURE OF THE INVENTION

Problems to be Solved by the Invention

The problem to be solved by the present invention is to provide an improved method for producing a highly polymerized aromatic polycarbonate resin which enables the increase in molecular weight of the aromatic polycarbonate resin satisfactorily while keeping good quality.

Means for Solving the Problems

As a result of the intensive studies to solve the above problems, the present inventors have found that a highly polymerized aromatic polycarbonate resin can be produced with a simple process by carrying out a transesterification reaction between an end-capped aromatic polycarbonate resin and a specific aliphatic diol compound in the presence of a transesterification catalyst under reduced pressure, and thus completed the present invention.

That is, the present invention is related to a process for producing as follows:

[1] A process for producing a highly polymerized aromatic polycarbonate resin which comprises a highly polymerizing process wherein aromatic polycarbonate is linked with an aliphatic diol compound having a boiling point of 240° C. or higher through a transesterification reaction in the presence of a transesterification catalyst under reduced pressure to increase the molecular weight.

[2] The process according to [1], wherein said aliphatic diol compound is a compound represented by the following general formula (I):
[Chemical Formula 1]

$$HO-(CH_2)_n-Q-(CH_2)_n-OH \quad (I)$$

wherein Q represents a hydrocarbon group having 6-40 carbon atoms which may contain aromatic rings and "n" represents an integer of 0-10 or "n" represents 1-10 in the case that Q contains no aliphatic hydrocarbon groups.

[3] The process according to [2], wherein said aliphatic diol compound is anyone of the compounds represented by the following general formulas (II)-(IV):
[Chemical Formula 2]

$$HO-(CH_2)_{n1}-Q_1-(CH_2)_{n1}-OH \quad (II)$$

$$HO-(CH_2)_{n2}-Q_2-(CH_2)_{n2}-OH \quad (III)$$

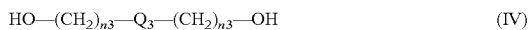
$$HO-(CH_2)_{n3}-Q_3-(CH_2)_{n3}-OH \quad (IV)$$

wherein $Q_1$ in the above formula (II) represents a hydrocarbon group having 6-40 carbon atoms containing aromatic ring(s), n1 in the above formula (II) represents an integer of 1-10, $Q_2$ in the above formula (III) represents a straight-chain or branched hydrocarbon group having 6-40 carbon atoms which may contain heterocyclic ring(s), n2 in the above formula (III) represents an integer of 1-10, $Q_3$ in the above formula (IV) represents a cyclic hydrocarbon group having 6-40 carbon atoms and n3 in the above formula (IV) represents an integer of 0-10.

[4] The process according to [3], wherein said aliphatic diol compound is a compound represented by the following general formula (II):
[Chemical Formula 3]

$$HO-(CH_2)_{n1}-Q_1-(CH_2)_{n1}-OH \quad (II)$$

wherein $Q_1$ represents a hydrocarbon group having 6-40 carbon atoms containing aromatic ring (s) and n1 represents an integer of 1-10.

[5] The process according to [4], wherein said aliphatic diol compound is selected from the group consisting of
4,4'-bis(2-hydroxyethoxy)biphenyl,
2,2'-bis[(2-hydroxyethoxy)phenyl]propane,
9,9'-bis[4-(2-hydroxyethoxy)phenyl]fluorene, fluorene glycol and fluorene diethanol.

[6] The process according to any one of [1] to [5], wherein said aliphatic diol compound is added in the amount of 0.01 to 1.0 mole per mole of the total amount of the terminals of the aromatic polycarbonate before said transesterification reaction.

[7] The process according to any one of [1] to [6], wherein the aromatic polycarbonate before said transesterification reaction in the highly polymerizing process is at least partially end-capped.

[8] The process according to [7], wherein the aromatic polycarbonate before said transesterification reaction is a terminally end-capped prepolymer obtained by reacting an aromatic dihydroxy compound with diester carbonate.

[9] The process according to [7] or [8], wherein the aromatic polycarbonate before said transesterification reaction in the highly polymerizing process has the concentration of terminal hydroxy groups of 1,500 ppm or less.

[10] The process according to any one of [1] to [9], wherein the weight average molecular weight (Mw) of the highly polymerized aromatic polycarbonate resin after the transesterification reaction in the highly polymerizing process is increased by 5,000 or more compared to that of the aromatic polycarbonate before the transesterification reaction.

[11] The process according to any one of [1] to [10], wherein the weight average molecular weight (Mw) of the aromatic polycarbonate before the transesterification reaction in the highly polymerizing process is 5,000 to 60,000.
[12] The process according to any one of [1] to [11], wherein the transesterification reaction in the highly polymerizing process is carried out at a temperature ranging from 240° C. to 320° C. under reduced pressure.
[13] The process according to any one of [1] to [12], wherein the transesterification reaction in the highly polymerizing process is carried out at a reduced pressure ranging from 13 kPaA (100 torr) to 0.01 kPaA (0.01 torr).
[14] The process according to any one of [1] to [13], which comprises a prepolymer-producing process wherein a terminally end-capped prepolymer is produced by reacting an aromatic dihydroxy compound with diester carbonate and a highly polymerizing process wherein said terminally end-capped prepolymer is linked with an aliphatic diol compound having a boiling point of 240° C. or higher through a transesterification reaction in the presence of a transesterification catalyst under reduced pressure to increase the molecular weight.
[15] A highly polymerized aromatic polycarbonate resin obtained by the process according to any one of [1] to [14].
[16] The highly polymerized aromatic polycarbonate resin according to [15], which has the weight average molecular weight (Mw) of 30,000-100,000.

Effect of the Invention

The present invention provides a method for producing a highly polymerized aromatic polycarbonate resin by a simple process wherein a terminally end-caped aromatic polycarbonate is subjected to a transesterification reaction with an aliphatic diol compound which is a compound having specific active hydrogen atoms in the presence of a transesterification catalyst under reduced pressure, which enables to obtain a high-molecular-weight polymer having good quality by melt polymerization under moderate conditions in a short time. Regarding the aromatic polycarbonate subjected to the transesterification reaction (or a chain-extension reaction or a highly polymerizing reaction), an aromatic polycarbonate resin obtained by conventional interfacial polymerization or an aromatic polycarbonate resin obtained by melt polymerization can be used. A used aromatic polycarbonate once polymerized and subjected to a molding process can also be used.

According to the present invention as mentioned above, the time required for highly polymerizing the polycarbonate can be shortened and the process can be carried out under moderate conditions such as a low-temperature and high-speed reaction of highly polymerizing, which enables to avoid a high-temperature and high-shear conditions compared to the conventional methods. Therefore, coloring, cross-linking, gelation or the like are not occurred in the polymer, which enables to obtain an aromatic polycarbonate resin excellent in color and quality. In addition, since the aliphatic diol compound itself is used as a linking agent, highly polymerizing can be achieved by a simpler process wherein the process of reacting with a salicylic acid derivative is not required compared to the conventional method of using a linking agent such as a salicylic acid derivative, and therefore the present method is economically efficient.

Though the highly polymerized aromatic polycarbonate resin obtained by the process of the present invention is a polycarbonate copolymer containing an aliphatic diol compound as a structural unit, it has a comparable properties compared to the conventional polycarbonate homopolymer such as bisphenol A, and what is more, it is highly polymerized by a melt polymerization without difficulty.

Whereas the interfacial polymerization using phosgene or other organic solvents is avoided because of the environmental problems, the present method of melt polymerization enables to obtain a polycarbonate having comparable properties compared to the highly polymerized polycarbonate such as bisphenol A obtained by the interfacial polymerization, which is quite significant.

MODE(S) FOR CARRYING OUT THE INVENTION

The process for producing a highly polymerized aromatic polycarbonate resin comprises a highly polymerizing process wherein aromatic polycarbonate is linked with an aliphatic diol compound through a transesterification reaction in the presence of a transesterification catalyst under reduced pressure to increase the molecular weight.

(1) Aromatic Polycarbonate

The aromatic polycarbonate to be highly polymerized in the process of the present invention which is, in other words, a polycarbonate resin before the transesterification reaction in the highly polymerizing process of the present invention, hereinafter "highly-polymerizing reaction", is a polycondensation polymer having the structure represented by the following general formula (1) as a repeating unit.

[Chemical Formula 4]

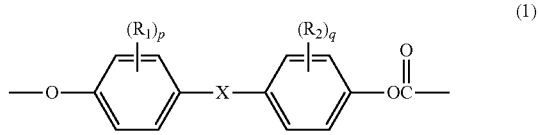

In the above general formula (1), $R_1$ and $R_2$ each independently represent a hydrogen atom, a halogen atom, an alkyl group having 1-20 carbon atoms, an alkoxy group having 1-20 carbon atoms, a cycloalkyl group having 6-20 carbon atoms, an aryl group having 6-20 carbon atoms, a cycloalkoxyl group having 6-20 carbon atoms or an aryloxy group having 6-20 carbon atoms. "p" and "q" each independently represent an integer of 0-4. X represents an organic group selected from the group consisting of the divalent organic groups represented by the following general formulas (1'):

[Chemical Formula 5]

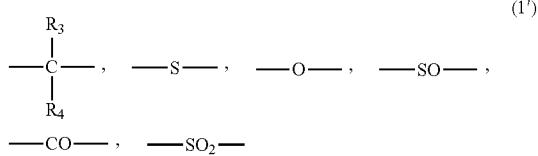

In the above general formula (1'), $R_3$ and $R_4$ each independently represent a hydrogen atom, an alkyl group having 1-10 carbon atoms or an aryl group having 6-10 carbon atoms. $R_3$ and $R_4$ can be linked with each other to form an aliphatic ring.

The above-mentioned aromatic polycarbonate before the highly-polymerizing reaction can be synthesized by interfacial polymerization or by melt polymerization. It also can be synthesized by solid-phase polymerization or thin-film polymerization. It also can be a recycled polycarbonate recovered from used products such as used disk molded products. These polycarbonates can be mixed with each other to use as the polymer before highly-polymerizing reaction. For example, a polycarbonate resin obtained by interfacial polymerization can be mixed with a polycarbonate resin obtained by meld polymerization. Or a polycarbonate resin obtained by melt polymerization or interfacial polymerization can be mixed with a recycled polycarbonate recovered from used disk molded products and the like.

The aromatic polycarbonate before the highly-polymerizing reaction of the present invention can also be described as a polycondensation product having a reaction product unit of an aromatic dihydroxy compound with a carbonate bond-forming compound as a main repeating unit.

Therefore, the aromatic polycarbonate before the highly-polymerized reaction can be obtained with ease by a known transesterification method wherein an aromatic dihydroxy compound which derives corresponding structure is reacted with diester carbonate in the presence of a basic catalyst, or by a known interfacial polymerization method wherein an aromatic dihydroxy compound is reacted with phosgene or the like in the presence of an acid binding agent.

Examples of the aromatic dihydroxy compounds to be used include a compound represented by the following general formula (2):

[Chemical Formula 6]

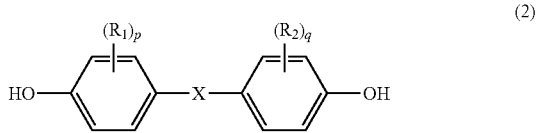

(2)

In the above general formula (2), $R_1$ and $R_2$ each independently represent a hydrogen atom, a halogen atom, an alkyl group having 1-20 carbon atoms, an alkoxy group having 1-20 carbon atoms, a cycloalkyl group having 6-20 carbon atoms, an aryl group having 6-20 carbon atoms, a cycloalkoxyl group having 6-20 carbon atoms or an aryloxy group having 6-20 carbon atoms. "p" and "q" each independently represent an integer of 0-4. X represents an organic group selected from the group consisting of the divalent organic groups represented by the following general formulas (2'):

[Chemical Formula 7]

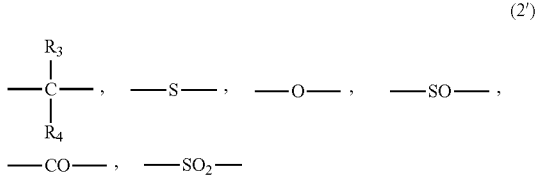

(2')

In the above general formula (2'), $R_3$ and $R_4$ each independently represent a hydrogen atom, an alkyl group having 1-10 carbon atoms or an aryl group having 6-10 carbon atoms. $R_3$ and $R_4$ can be linked with each other to form an aliphatic ring.

Examples of the aromatic dihydroxy compounds include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 4,4'-dihydroxydiphenylether 4,4'-dihydroxy-3,3'-dimethylphenylether, 4,4'-dihydroxyphenylsulfide, 4,4'-dihydroxy-3,3'-dimethyldiphenylsulfide, 4,4'-dihydroxydiphenylsulfoxide, 4,4'-dihydroxy-3,3'-dimethyldiphenylsulfoxide, 4,4'-dihydroxydiphenylsulfone and 4,4'-dihydroxy-3,3'-dimethyldiphenylsulfone.

Among them, it is preferable to use 2,2-bis(4-hydroxyphenyl)propane for the reason that it is stable as a monomer, that one having a low impurity content is easily available and so on.

The aromatic polycarbonate resin of the present invention can be obtained by combining two or more of the above-mentioned various monomers (aromatic dihydroxy compounds) if necessary for the purpose of controlling optical properties such as controlling a glass transition temperature, improving the fluidity, improving the refractive index and reducing the birefringence.

The basic method of the process for producing the aromatic polycarbonate before the highly-polymerizing reaction will be described below.

In the interfacial polymerization, examples of carbonate bond-forming compounds include carbonyl halides such as phosgene and haloformates.

In the case of using phosgene as a carbonate bond-forming compound, the reaction is usually carried out in the presence of an acid binding agent and a solvent. Examples of the acid binding agents include alkali metal hydroxide such as sodium hydroxide and potassium hydroxide and amines such as pyridine. Examples of solvents include halogenated hydrocarbon such as methylene chloride and chlorobenzene. In addition, a catalyst such as tertiary amines or quaternary ammonium salts can be used for accelerating the reaction. The reaction temperature is usually in the range from 0° C. to 40° C. and the reaction time is usually in the range from several minutes to 5 hours.

In the case of melt polymerization, diester carbonate is used as a carbonate bond-forming compound. Examples of diester carbonates include a compound represented by the following general formula (4):

[Chemical Formula 8]

(4)

In the above general formula (4), "A" represents a monovalent linear, branched or ringed hydrocarbon group having 1-10 carbon atoms which may be substituted. The two "A"s can be same or different with each other.

Examples of the diester carbonate include aromatic diester carbonates such as diphenyl carbonate, ditolyl carbonate, bis(2-chlorophenyl)carbonate, m-cresyl carbonate, dinaphthyl carbonate and bis(4-phenylphenyl)carbonate. Other diester carbonates such as dimethyl carbonate, diethyl carbonate, dibutyl carbonate and dicyclohexyl carbonate can be used if necessary. Among them, it is preferable to use diphenyl carbonate from a viewpoint of reactivity, stability against coloring of the resin thus obtained and cost. It is preferable to use diester carbonate in an amount of 0.95-1.30 mole, more preferably in an amount of 0.98-1.20 mole, per mole of the total amount of the aromatic dihydroxy compound.

The melt polymerization using diester carbonate as a carbonate bond-forming compound is carried out by stirring the aromatic dihydroxy component with diester carbonate at a predetermined rate on heating under an inert gas atmosphere and then distilling the produced alcohols or phenols away.

While the reaction temperature is depending on the boiling point of alcohol or phenol thus produced, it is usually in the range from 120° C. to 350° C. The reaction is carried out under reduced pressure from the beginning and is completed by continuously distilling the produced alcohols or phenols. Basic compounds or transesterification catalysts which are commonly used can be used in order to accelerate the reaction.

The aromatic polycarbonate before the highly-polymerizing reaction in the present invention is preferably obtained by transesterification reaction between an aromatic dihydroxy compound and diester carbonate. The aromatic polycarbonate before the highly-polymerizing reaction in the present invention is more preferably a terminally end-capped prepolymer obtained by reaction between an aromatic dihydroxy compound and diester carbonate.

Regarding the terminal groups of the above-mentioned terminally end-capped aromatic polycarbonate, the content of end-capped terminal groups derived from an aromatic monohydroxy compound based upon the total amount of the terminals is preferably 60 mol % or more, more preferably 70% or more, most preferably 80% or more. In this case, the specific effect of the present invention can be exhibited remarkably.

The content of end-capped terminal groups based upon the total amount of the terminals of a polymer can be analyzed by $^1$H-NMR analysis of the polymer. It is also possible to analyze by measuring the concentration of terminal hydroxy groups by spectrometric measurement using Ti complex. The concentration of terminal hydroxy groups by this measurement is preferably 1,500 ppm or less, more preferably 1,000 ppm or less. In this case, the effect of highly polymerizing reaction is enhanced which will bring about a preferred result.

The linking reaction (or the highly polymerizing reaction) in the highly polymerizing process of the present invention is using the transesterification reaction between the end-capped terminal groups and the aliphatic diol compound introduced. Therefore, when the content of the terminal hydroxy groups is more than the above-mentioned range or the content of end-capped terminal groups is less than the above-mentioned range, the effect of the increase in molecular weight by the linking reaction (the highly polymerizing reaction) may not be achieved sufficiently.

Examples of the end-capped terminal groups include a phenyl terminal group, a cresyl terminal group, an o-tolyl terminal group, a p-tolyl terminal group, a p-t-butylphenyl terminal group, a biphenyl terminal group, an o-methoxycarbonylphenyl terminal group and a p-cumylphenyl terminal group.

Among them, a terminal group derived from an aromatic monohydroxy compound having a low boiling point which can be easily removed from the reaction system of the linking reaction described below is preferable. A phenyl terminal group or a p-tert-butylphenyl terminal group is more preferable.

In the case of interfacial polymerization, the end-capped terminal group can be introduced by using a terminal terminating agent at the time of producing the aromatic polycarbonate. Examples of the terminal terminating agents include p-tert-butyl phenol, phenol, p-cumylphenol and long-chain alkyl substituted phenol. The amount of the terminal terminating agent can be determined properly according to the intended content of terminal groups of the aromatic polycarbonate which means the desired molecular weight of the aromatic polycarbonate, the reaction apparatus to be used, reaction conditions or the like.

In the case of melt polymerization, end-capped terminal groups can be introduced by using diester carbonate such as diphenyl carbonate in an amount excess to that of the aromatic dihydroxy compound at the time of producing the aromatic polycarbonate. While depending on the reaction apparatus to be used and reaction conditions, diester carbonate is used preferably in an amount of 1.00 to 1.30 mole, more preferably 1.02 to 1.20 mole per mole of the aromatic dihydroxy compound, thereby an aromatic polycarbonate satisfying the above-mentioned content of end-capped terminal groups can be obtained.

According to the present invention, it is preferable to use a terminally end-capped prepolymer obtained by transesterification reaction between an aromatic dihydroxy compound and diester carbonate as the aromatic polycarbonate before the highly-polymerizing reaction.

Furthermore, at the time of producing the aromatic polycarbonate having the repeating unit represented by the above-mentioned general formula (1), a dicarboxylic acid compound can be used together with the above-mentioned aromatic dihydroxy compound to produce polyestercarbonate.

Examples of the preferable dicarboxylic acid compounds include terephthalic acid, isophthalic acid, naphthalene dicarboxylic acid and 1,4-cyclohexane dicarboxylic acid. In addition, these dicarboxylic acid compounds can be subjected to reaction preferably in the form of an acid chloride or an ester compound. Furthermore, at the time of producing a polyestercarbonate resin, dicarboxylic acid is preferably used in an amount of 0.5 to 45 mol %, more preferably 1 to 40 mol %, based upon 100 mol % of the total amount of the above-mentioned dihydroxy component and the dicarboxylic acid component.

Regarding the molecular weight of the aromatic polycarbonate before the highly-polymerizing reaction to be used in the highly polymerizing process of the present invention, it is preferable that the weight average molecular weight (Mw) of the prepolymer is in the range from 5,000 to 60,000, more preferably in the range from 10,000 to 50,000, most preferably in the range from 10,000 to 40,000.

When using a prepolymer having low molecular weight outside the above range, influence of copolymerization on the properties of polymer might be serious. Though it may enable the modification of polymer properties, it would not be preferable in terms of the effect of highly polymerization of the aromatic polycarbonate.

When using a prepolymer having higher molecular weight outside the above range, the concentration of the active terminals might be decreased, which may cause insufficiency of the effect of highly polymerization. In addition, since the prepolymer is a high-viscosity polymer, it is necessary to carry out the reaction under the conditions of high temperature, high shear and long term, which is not preferable for obtaining a high-quality aromatic polycarbonate resin.

(2) Aliphatic Diol Compound

According to the present invention, the above-mentioned terminally end-capped aromatic polycarbonate is reacted with an aliphatic diol compound as a linking agent in the presence of a transesterification catalyst under reduced pressure, thereby highly polymerization can be achieved rapidly under moderate conditions. That is, the end-capped terminal group derived from the aromatic hydroxy compound present in the polycarbonate before the highly-polymerizing reaction is replaced by an alcoholic hydroxy group, thereby promoting the linking reaction among the aromatic polycarbonate molecules before the highly-polymerizing reaction to increase the molecular weight of the resulting molecule.

The aliphatic diol compound to be used in the highly-polymerizing process of the present invention is required to have a higher boiling point than that of the aromatic monohydroxy compound which is produced accompanied by the highly-polymerization reaction from the terminally end-capped aromatic polycarbonate subjected to the highly-polymerizing reaction and is distilled away. In addition, since it has to be immobilized under the above-mentioned temperature and pressure, it is preferable to use an aliphatic diol compound having a relatively high boiling point for the linking reaction of the present invention. More precisely, it is preferable to use an aliphatic diol compound having a boiling point of 240° C. or higher, more preferably 250° C. or higher. While the upper limit of the boiling point should not be particularly limited, it would be sufficient to have a boiling point of 500° C. or lower.

The term "aliphatic diol compound" according to the present invention means a compound having a chain or cyclic aliphatic hydrocarbon group such as an alkylene group or a cycloalkylene group binding to the terminal hydroxy (—OH) groups. Examples of the aliphatic diol compound include a compound having divalent alcoholic hydroxy groups represented by the following formula (I).

[Chemical Formula 9]

$$HO—(CH_2)_n—Q—(CH_2)_n—OH \quad (I)$$

In the above general formula (I), Q represents a hydrocarbon group having 6-40 carbon atoms, preferably a hydrocarbon group having 6-30 carbon atoms. The hydrocarbon group can be straight chain, branched or cyclic. It can also contain ring structures such as aromatic ring(s) and heterocyclic ring (s). "n" represents an integer of 0 to 10, preferably 1 to 4. In the case that Q does not contain aliphatic hydrocarbon groups, "n" represents an integer of 1 to 10, preferably 1 to 4.

Examples of the more preferable aliphatic diol compounds to be used in the present invention include compounds having divalent alcoholic hydrocarbon groups represented by any of the following general formulas (II) to (IV):

[Chemical Formula 10]

$$HO—(CH_2)_{n1}—Q_1—(CH_2)_{n1}—OH \quad (II)$$

$$HO—(CH_2)_{n2}—Q_2—(CH_2)_{n2}—OH \quad (III)$$

$$HO—(CH_2)_{n3}—Q_3—(CH_2)_{n3}—OH \quad (IV)$$

In the above general formula (II), "$Q_1$" represents a hydrocarbon group having 6-40 carbon atoms containing aromatic ring(s), preferably a hydrocarbon group having 6-30 carbon atoms containing aromatic ring(s). "n1" represents an integer of 1-10, preferably an integer of 1-4. Examples of the aromatic rings include a phenyl group, a biphenyl group, a fluorenyl group and a naphthyl group.

In the above general formula (III), "$Q_2$" represents a straight-chain or branched hydrocarbon group having 6-40 carbon atoms which may contain heterocyclic ring(s), preferably a straight-chain or branched hydrocarbon group having 6-30 carbon atoms which may contain heterocyclic ring(s). "n2" represents an integer of 1-10, preferably an integer of 1-4.

In the above general formula (IV), "$Q_3$" represents a cyclic hydrocarbon group having 6-40 carbon atoms such as a cycloalkylene group, preferably a cyclic hydrocarbon group having 6-30 carbon atoms. "n3" represents an integer of 0-10, preferably an integer of 1-4. Examples of the cycloalkylene groups include a cyclohexyl group, a bicyclodecanyl group and a tricyclodecanyl group.

Among the compounds represented by any of the above-mentioned general formulas (II) to (IV), the compound represented by the general formula (II) is most preferable.

Examples of the aliphatic diol compounds which can be used for the present invention include straight-chain aliphatic diols such as 1,10-decanediol, 1,12-dodecanediol, 1,18-octadecanediol, 1,20-eicosanediol and 1,22-docosanediol; aliphatic diols containing ring structure(s) such as 1,4-cyclohexanediol, 1,4-cyclohexane dimethanol, tricycle (5.2.1.0$^{2.6}$) decane dimethanol, decalin-2,6-dimethanol, pentacyclopentadecalin dimethanol, isosorbide and isomannide; spiroglycols such as the compound represented by the following formula (4) wherein R5, R6, R7 and R8 each independently represent a hydrogen atom or a monovalent alkyl group having 1-10 carbon atoms;

[Chemical Formula 11]

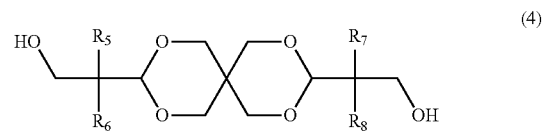

(4)

aliphatic diols containing aromatic ring(s) such as naphthalene dimethanol, biphenyl dimethanol, 1,4-bis(2-hydroxyethoxy)phenyl, 4,4'-bis(2-hydroxyethoxy)biphenyl, 2,2'-bis[(2-hydroxyethoxy)phenyl]propane, 9,9-bis[4-(2-hydroxyethoxy)phenyl]fluorene, 9,9-bis(hydroxymethyl)fluorene, 9,9-bis(hydroxyethyl)fluorene, fluorene glycol, fluorene diethanol, "NFAL-PE" represented by the following formula and "BPAL-PE" represented by the following formula.

[Chemical Formula 12]

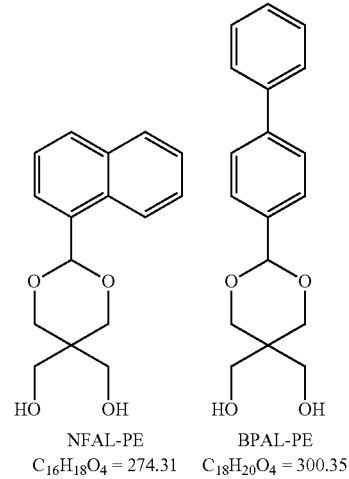

NFAL-PE  BPAL-PE
$C_{16}H_{18}O_4 = 274.31$  $C_{18}H_{20}O_4 = 300.35$

Among them, decalin-2,6-dimethanol, pentacyclopentadecalin dimethanol, 4,4'-bis(2-hydroxyethoxy)biphenyl, 2,2'-bis[(2-hydroxyethoxy)phenyl]propane, 9,9-bis[4-(2-hydroxyethoxy)phenyl]fluorene, fluorene glycol and fluorene diethanol are most preferable.

They can be used each independently or two or more of them can be used in combination with each other.

Regarding the aliphatic diol compound actually used, species of the available compounds can be varied depending on the reaction conditions or the like.

The practical reaction scheme of the linking and highly-polymerizing reaction by the aliphatic diol compound is exemplified as follows:

[Chemical Formula 13]

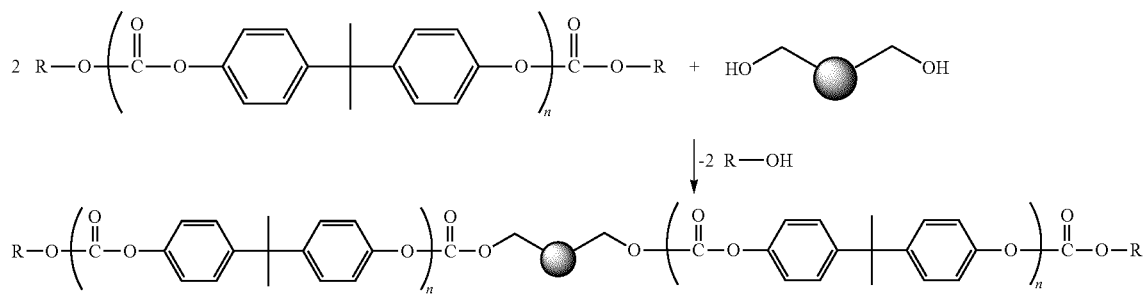

In the above reaction scheme, the aromatic monohydroxy compound represented by "R—OH" is removed away as the reaction proceeds under reduced pressure. Thereby, the molecular weight of the polymer can be increased.

The amount of the aliphatic diol compound to be used according to the present invention is preferably 0.01 to 1.0 mole, more preferably 0.1 to 1.0 mole, further preferably 0.1 to 0.5 mole, most preferably 0.2 to 0.4 mole per mole of the total amount of the terminals of the aromatic polycarbonate before the highly polymerizing reaction.

When the amount of the aliphatic diol compound to be used is too large beyond the above range, insertion reaction wherein the aliphatic diol compound is inserted into the main chain of the aromatic polycarbonate resin as a copolymerizing component might occur, which might cause a serious influence of the copolymerization on the polymer properties because of the increase in the copolymerization ratio. Though it may enable the modification of polymer properties, it would not be preferable in terms of the effect of highly polymerization of the aromatic polycarbonate.

When the amount of the aliphatic diol compound to be used is too small beyond the above range, highly polymerization might be ineffective which would not be preferable.

In the present invention, "the total amount of the terminals of polycarbonate" or "the total amount of the terminals of polymer" can be determined by calculating as follows:

In the case of polycarbonate with no branches or straight-chain polymer, for example, the number of terminal groups per molecule is two. Therefore, when the amount of polycarbonate with no branches is 0.5 mol, the total amount of the terminal groups will be 1 mole.

In the case of polycarbonate having branches, the terminal groups of the branched chain is also included in the total amount of the terminals. The total amount of the terminals including the terminal groups of the branched chain can be determined by an NMR analysis or by calculating from molecular weight and/or an introduction amount of branching agents or the like.

It is desirable that the content of impurities such as chlorine, nitrogen, alkali metals and heavy metals in the aliphatic diol compound is low. Examples of alkali metals include sodium, potassium and salts or derivatives thereof. Examples of heavy metals include iron, nickel and chromium.

Regarding the content of these impurities, the content of chlorine is preferably 1000 ppm or less, the content of nitrogen is preferably 100 ppm or less and the content of alkali metals is preferably 10 ppm or less. Regarding the heavy metals, the content of iron is preferably 3 ppm or less, the content of nickel is preferably 2 ppm or less and the content of chromium is preferably 1 ppm or less.

(3) Highly Polymerizing Reaction

The highly polymerizing reaction in the highly polymerizing process of the present invention is a transesterification reaction. As the catalyst to be used for the transesterification reaction which is the highly polymerizing reaction of the present invention, a basic compound catalyst and a transesterification catalyst commonly used as a catalyst for producing polycarbonate can be used.

Examples of the basic compound catalysts include alkali metal compounds and/or alkali earth metal compounds and nitrogen-containing compounds.

Preferable examples of alkali metal compounds and/or alkali earth metal compounds include organic acid salts, inorganic salts, oxide, hydroxide, hydride, alkoxide, quaternary ammonium hydroxide and salts thereof and amines of alkali metals and alkali earth metals. These compounds can be used each independently or two or more of them can be used in combination with each other.

Examples of alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium boron hydride, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, a disodium salt of bisphenol A, a dipotassium salt of bisphenol A, a dicesium salt of bisphenol A and a dilithium salt of bisphenol A, a sodium salt of phenol, a potassium salt of phenol, a cesium salt of phenol, a lithium salt of phenol.

Examples of alkali earth metal compounds include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenylphosphate.

Examples of nitrogen-containing compounds include base such as quaternary ammonium hydroxides containing alkyl groups and/or aryl groups such as tetramethyl ammonium hydroxide, tetraethyl ammonium hydroxide, tetrapropyl ammonium hydroxide, tetrabutyl ammonium hydroxide and trimethylbenzyl ammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzoimidazole; and a base or a basic salt such as ammonia, tetramethyl ammonium borohydride, tetrabutyl ammonium borohydride, tetrabutyl ammonium tetraphenylborate and tetraphenyl ammonium tetraphenylborate, or basic salts thereof.

Regarding the transesterification catalyst, salts of zinc, tin, zirconium or lead can be preferably used. They can be used each independently or two or more of them can be used in combination with each other.

Examples of the transesterification catalysts include zinc acetate, zinc benzoate, zinc 2-ethylhexanoate, tin chloride (II), tin chloride (IV), tin acetate (II), tin acetate (IV), dibutyltin dilaurate, dibutyltin oxide, dibutyltin dimethoxide, zirconium acetylacetonate, zirconium oxyacetate, zirconium tetrabutoxide, lead acetate (II) and lead acetate (IV).

The above catalysts can be used in an amount of preferably $1\times10^{-9}$ to $1\times10^{-3}$ mole, more preferably $1\times10^{-7}$ to $1\times10^{-5}$ mole per mole of the total amount of dihydroxy compounds.

The reaction temperature of the highly polymerizing reaction or the linking reaction (or the connection reaction) by the above-mentioned aliphatic diol compound is preferably in the range from 240° C. to 320° C., more preferably in the range from 260° C. to 310° C., most preferably in the range from 270° C. to 300° C.

The degree of pressure reduction is preferably in the range of 13 kPaA (100 torr) or less, more preferably in the range of 1.3 kPaA (10 torr) or less, further preferably in the range from 0.67 kPaA to 0.013 kPaA (from 5 torr to 0.1 torr). When the highly polymerizing reaction is carried out at normal pressure, degradation of molecular weight of polymer might be induced.

By the use of the aliphatic diol compound, the increase in the weight average molecular weight (Mw) of the aromatic polycarbonate resin after the highly polymerizing reaction can be increased preferably by 5,000 or more, more preferably by 10,000 or more, further preferably 15,000 or more compared to that of the aromatic polycarbonate before the highly polymerizing reaction.

While the weight average molecular weight (Mw) of the highly polymerized aromatic polycarbonate resin obtained by the process of the present invention should not be particularly limited, it would be preferably 30,000 to 100,000, more preferably 30,000 to 80,000.

The type of reaction apparatus or the materials of the vessels are not particularly limited and any of the known apparatus can be used. Any of the continuous polymerization or the batch polymerization can be used. The reaction apparatus used for carrying out the above-mentioned reaction can be a vertical reactor equipped with an anchor blade, a Maxblend impeller, a helical ribbon blade or the like, or can be a horizontal reactor equipped with a paddle blade, a lattice blade, a spectacle-shaped blade or the like, or can be an extruder equipped with a screw. In addition, it is desirable to use a reaction apparatus wherein the above-mentioned apparatuses are properly combined with each other taking viscosity of the polymer in consideration. It is more desirable to use a reaction apparatus equipped with a screw having a good horizontal stirring efficiency and a unit capable of dealing with reduced pressure.

It is further desirable to use a biaxial extruder or a horizontal reactor having a polymer seal and a vent.

Regarding the material of the apparatus, it is desirable to use a material which has no influence on the color tone of the polymer such as stainless steel selected from SUS310, SUS316, SUS304 or the like, nickel and iron nitride. In addition, a buff processing, an electropolishing processing and/or metal plating such as chromium plating can be applied on the inner side of the apparatus which is a place contacting with polymer.

According to the present invention, a catalyst deactivator can be added to the highly polymerized polymer in the above-mentioned highly polymerizing process. It is desirable, in general, to employ a method of adding known acid materials to deactivate catalyst. Examples of the acid materials include aromatic sulfonic acid such as p-toluenesulfonic acid, aromatic sulfonic acid esters such as butyl p-toluenesulfonate, organohalides such as stearic acid chloride, butyric acid chloride, benzoyl chloride and toluenesulfonic acid chloride, alkyl sulfate such as dimethyl sulfate and organohalides such as benzyl chloride.

After deactivating the catalyst, a process wherein to remove low-boiling compounds in the polymer by degassing under reduced pressure ranging from 0.013 to 0.13 kPaA (from 0.1 torr to 1 torr) at a temperature ranging from 200° C. to 350° C. For this process, a horizontal reactor equipped with a stirring blade excellent in surface renewability such as a paddle blade, a lattice blade and a spectacle-shaped blade or a thin-film evaporator can preferably be used.

According to the present invention, various additives such as heat stabilizer, antioxidant, pigment, dye enhancing agents, fillers, ultraviolet absorber, lubricant, mold release agents, crystal nucleating agents, plasticizer, fluidability-improving agents and antistatic agents can be added to the polymer.

These additives can be mixed with the polycarbonate resin by a conventional method. For example, a method wherein the components are subjected to dispersion mixing by a rapid mixer such as a tumble mixer, a Henschel mixer, a ribbon blender and a super mixer, and then the mixture is subjected to melting and kneading by an extruder, a banbury mixer, a roll kneader or the like can be employed appropriately.

The polycarbonate disclosed in the present invention can be used for various molded products or sheet or film products obtained by injection molding, blow molding, extrusion molding, injection blow molding, rotational molding, compression molding or the like. In the case of using the polycarbonate for these purposes, the polycarbonate produced by the process of the present invention can be used independently, or can be used by blending with other polymers. Depending on the intended use, it can also be used accompanied with a process of hard coating, laminating or the like.

Examples of the molded products include optical media products such as compact discs, digital video discs, mini discs and magnetic optical discs, optical communication media such as optical fibers, optical components such as a headlight lens of a car and a lens on a camera, optical equipment components such as a siren light cover and an illumination lump cover, replacement goods for a window glass of a vehicle such as a train and a car, replacement goods for a window glass of a house, a daylight window components such as a sunroof and a greenhouse roof, lenses or chassis of a goggle, sunglasses and spectacles, packages or chassis of office automation equipments such as a copying machine, a fax machine and a personal computer, chassis of home electric appliances such as a TV set and a microwave oven, electronic components such as a connector and an IC tray, protective equipments such as a helmet, a protector and a protective mask, platewares such as a tray and medical goods such as a case for dialysis and artificial denture.

However, these examples are not intended to limit the scope of the present invention.

EXAMPLES

The present invention will be described in more detail below, referring to examples, which are not intended to limit the scope of the present invention.

The data of the examples below were measured by using the following methods and/or devices:
1) Weight-average molecular weight in terms of polystyrene (Mw): Measured by GPC using tetrahydrofuran as a developing solvent, an analytical curve was prepared using a standard polystyrene having a known molecular weight (molecular weight distribution=1). Based upon the analytical curve, Mw was calculated from the retention time of GPC.
2) Glass transition temperature (Tg): Measured by differential scanning calorimeter (DSC).
3) Total amount of terminal groups of polymer: 0.25 g of a polymer sample was dissolved into 5 ml of deuterated chloroform and then the amount of the terminals was measured at 23° C. by using a nuclear magnetic resonance 1H-NMR spectrometer, trade name "LA-500", manufactured by JASCO Corporation. The result was shown as the number of moles per ton of polymer.
4) Concentration of terminal hydroxy groups (ppm): Measured by UV/visible spectroscopy (546 nm) of a complex formed from the polymer and titanium tetrachloride in a methylene chloride solution.
5) Color of polymer (YI value): 4 g of a polymer sample was dissolved into 25 ml of methylene chloride and then YI value was measured by using a spectroscopy colorimeter manufactured by NIPPON DENSHOKU INDUSTRIES CO., LTD, trade name "SE-2000".

Example 1-2

Aromatic polycarbonate was prepared from bisphenol A and diphenyl carbonate by melt polymerization using 1.1 mole of diphenyl carbonate per mole of bisphenol A in the presence of sodium hydrogen carbonate ($NaHCO_3$) as a catalyst.

More precisely, 10.00 kg (43.8 mol) of 2,2-bis(4-hydroxyphenyl)propane, 10.56 kg (49.3 mol) of diphenyl carbonate and 1 µmol/mol of sodium hydrogen carbonate as a catalyst were charged into a 50-liter SUS316 reactor equipped with a stirrer and a distiller mounting a heat medium heating unit, and the temperature was raised to 180° C. in a nitrogen atmosphere. After being melted, they were stirred for 30 minutes.

Subsequently, the pressure was reduced to 20 kPaA (150 torr), and at the same time, the temperature was raised to 200° C. at a rate of 60° C./hr. Keeping the temperature for 40 minutes, the transesterification reaction was carried out.

Then, the temperature was raised to 225° C. at a rate of 75° C./hr and the temperature was kept for 15 minutes. Subsequently, the temperature was raised to 260° C. at a rate of 65° C./hr and the pressure was reduced to 0.13 kPaA (1 torr) or less taking 1 hour to obtain 10 kg of pelletized aromatic polycarbonate prepolymer having the weight average molecular weight (Mw) of 31,000, the total amount of terminal groups of 256 mole and the concentration of terminal hydroxy groups of 400 ppm.

200 g of the pelletized aromatic polycarbonate prepolymer thus obtained and the aliphatic diol compound whose name and the amount used were shown in Table 1 were charged into a 1000 ml SUS316 kneader mounted with an oil-heating jacket. Regarding the catalyst for highly polymerizing reaction, the polymerization catalyst ($NaHCO_3$) which had been used in the process of preparing the aromatic polycarbonate before linking was continuously used directly.

The mixture was stirred and kneaded for 30 minutes at a jacket temperature of 290° C. under reduced pressure of 0.04 kPaA (0.3 torr). Phenol distilled from the reaction system was condensed in a cooling tube to remove away. The aromatic polycarbonate thus obtained was extracted to measure the weight average molecular weight. The properties of the polymer thus obtained were shown in Table 1.

Examples 3-7

In the same manner as Example 1, preparation of aromatic polycarbonate from bisphenol A and diphenyl carbonate was carried out by melt polymerization using 1.1 mole of diphenyl carbonate per mole of bisphenol A by melt polymerization in the presence of 1 µmol/mol of sodium hydrogen carbonate ($NaHCO_3$) as a catalyst to obtain pelletized aromatic polycarbonate prepolymer having the weight average molecular weight (Mw) of 31,000, the total amount of terminal groups of 256 mol and the concentration of terminal hydroxy groups of 400 ppm.

30 g of the pelletized aromatic polycarbonate prepolymer thus obtained was charged into a four-neck flask of 300 cc equipped with a stirrer and a distiller mounted with an oil bath. The polymerization catalyst ($NaHCO_3$) which had been used in the process of preparing the aromatic polycarbonate before linking was continuously used directly for the catalyst for highly polymerizing reaction.

Heating and melting was carried out at the oil-bath temperature of 290° C. under vacuum. Subsequently, the aliphatic diol compound whose name and the amount used were shown in Table 1 was charged therein, and was kneaded with stirring for 30 minutes at the oil-bath temperature of 290° C. under reduced pressure of 0.04 kPaA (0.3 torr). Phenol distilled from the reaction system was condensed in a cooling tube to remove away. The aromatic polycarbonate thus obtained was extracted to measure the weight average molecular weight. The properties of the polymer thus obtained were shown in Table 1.

Examples 8-9

Preparation of aromatic polycarbonate from bisphenol A and phosgene was prepared by interfacial polymerization using p-tert-butylphenol as a terminal terminating agent to obtain aromatic polycarbonate prepolymer flakes having the weight average molecular weight (Mw) of 32,000, the total amount of terminal groups of 253 mol and the concentration of terminal hydroxy groups of 200 ppm.

200 g of the aromatic polycarbonate prepolymer flakes thus obtained, the aliphatic diol compound whose name and the amount used were shown in Table 1 and 1 µmol/mol of catalyst ($NaHCO_3$), were charged into a SUS316 kneader of 1000 ml mounted with an oil-heating jacket. The amount of catalyst was calculated as the number of moles based upon the amount of bisphenol A units.

Kneading with stirring was carried out for 30 minutes at the oil-bath temperature of 290° C. under reduced pressure of 0.04 kPaA (0.3 torr). P-tert-butylphenol distilled from the reaction system was condensed in a cooling tube to remove away. The aromatic polycarbonate thus obtained was extracted to measure the weight average molecular weight. The properties of the polymer thus obtained were shown in Table 1.

Comparative Example 1

45.6 g (0.20 mol) of 2,2-bis(4-hydroxyphenyl)propane, 23.3 g (0.202 mol) of diphenylcarbonate and 1 µmol/mol of sodium hydrogen carbonate as a catalyst, which was calculated as the number of moles based upon the amount of bisphenol A units, were charged into a four-neck flask of 300 cc equipped with a stirrer and a distiller. Stirring was carried out for 30 minutes by heating at 180° C. in a nitrogen atmosphere.

Subsequently, the pressure was reduced to 20 kPaA (150 torr), and at the same time, the temperature was raised to 200° C. at a rate of 60° C./hr. Keeping the temperature for 40 minutes, the transesterification reaction was carried out.

Then, the temperature was raised to 225° C. at a rate of 75° C./hr and the temperature was kept for 10 minutes. Subsequently, the temperature was raised to 290° C. at a rate of 65° C./hr and the pressure was reduced to 0.13 kPaA (1 torr) or less taking 1 hour. Polymerization was carried out by reacting under stirring for 6 hours in total. In the latter half of the polymerization, it became difficult to extract phenol because of the increase of viscosity, which caused the rate of increase in molecular weight being too slow. It took 6 hours to increase the molecular weight to a comparable level, which was so long that the polymer was seriously colored. The properties of the polymer thus obtained were shown in Table 2.

Comparative Example 2

The experiment was carried out in a same manner as Example 1 except for avoiding the use of aliphatic diol compounds. The properties of the polymer thus obtained were shown in Table 2.

Comparative Example 3

The experiment was carried out in a same manner as Example 1 except for conducting the highly polymerizing process under normal pressure. The properties of the polymer thus obtained were shown in Table 2.

Comparative Example 4

The experiment was carried out in a same manner as Example 8 except for avoiding the use of diol compounds. The properties of the polymer thus obtained were shown in Table 2.

Comparative Example 5

The experiment was carried out in a same manner as Example 8 except for conducting the highly polymerizing process under normal pressure. The properties of the polymer thus obtained were shown in Table 2.

Comparative Example 6

The experiment was carried out in a same manner as Example 1 except for using 2,2-bis(4-hydroxyphenyl)propane which was an aromatic diol compound having a boiling point of 420° C., hereinafter "BPA", as a diol compound. The properties of the polymer thus obtained were shown in Table 2.

Comparative Example 7

The experiment was carried out in a same manner as Example 8 except for using BPA, which was an aromatic diol compound, as a diol compound. The properties of the polymer thus obtained were shown in Table 2.

Comparative Example 8

The experiment was carried out in a same manner as Example 1 except for using 1.1 g of 1,4-dibutanol which was a low-boiling aliphatic diol having a boiling point of 228° C., hereinafter "BD", as a diol compound. The properties of the polymer thus obtained were shown in Table 2.

Comparative Example 9

The experiment was carried out in a same manner as Example 1 except for using 1.3 g of neopentyl glycol which was a low-boiling aliphatic diol having a boiling point of 211° C., hereinafter "NPG", as a diol compound. The properties of the polymer thus obtained were shown in Table 2.

Comparative Example 10

The experiment was carried out in a same manner as Example 8 except for using 1.3 g of NPG as a diol compound. The properties of the polymer thus obtained were shown in Table 2.

Examples 10-11

The experiment was carried out in a same manner as Example 1 except for using the compounds whose name and the amount used were shown in Table 3 as a diol compound. The properties of the polymer thus obtained were shown in Table 3.

Examples 12-13

The experiment was carried out in a same manner as Example 3 except for using the compounds whose name and the amount used were shown in Table 3 as a diol compound. The properties of the polymer thus obtained were shown in Table 3.

The diol compounds used above were as follows:
BPEF: 9,9-bis[4-(2-hydroxyethoxy)phenyl]fluorene having a boiling point of approximately 625° C.
BP-2EO: 4,4'-bis(2-hydroxyethoxy)biphenyl having a boiling point of approximately 430° C.
BPA-2EO: 2,2'-bis[(2-hydroxyethoxy)phenyl]propane having a boiling point of approximately 480° C.
FG: fluorene glycol having a boiling point of approximately 370° C.
PCPDM: penta-cyclopentadecane dimethanol having a boiling point of approximately 420° C.
CHDM: cyclohexane-1,4-dimethanol having a boiling point of approximately 280° C.
DDM: decalin-2,6-dimethanol having a boiling point of approximately 341° C.
BD: 1,4-butanediol having a boiling point of 228° C.
NPG: neopentyl glycol having a boiling point of 211° C.
FE: fluorene diethanol having a boiling point of approximately 410° C.

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Diol: Species | BPEF | BPA-2EO | BP-2EO | FG | PCPDM | CHDM | DDM | BPEF | BPA-2EO |
| Diol: Amount | | | | | | | | | |
| (g) | 5.5 g | 4.0 g | 0.51 g | 0.42 g | 0.49 g | 0.27 g | 0.37 g | 5.5 g | 4.0 g |
| (mol)*1 | 0.25 mol | 0.25 mol | 0.25 mol | 0.25 mol | 0.25 mol | 0.25 mol | 0.25 mol | 0.25 mol | 0.25 mol |
| Mw | 62,000 | 64,000 | 63,000 | 64,000 | 61,000 | 40,000 | 54,000 | 65,000 | 66,000 |
| Tg(° C.) | 154 | 155 | 154 | 154 | 153 | 150 | 151 | 154 | 155 |
| YI value | 0.90 | 0.80 | 0.80 | 0.90 | 1.00 | 1.50 | 1.60 | 0.80 | 0.90 |

*1The number of moles per mole of the total amount of the terminal groups of the aromatic polycarbonate before the highly polymerizing reaction.
BPEF: 9,9-bis[4-(2-hydroxyethoxy)phenyl]fluorene having a boiling point of approximately 625° C.
BP-2EO: 4,4'-bis(2-hydroxyethoxy)biphenyl having a boiling point of approximately 430° C.
BPA-2EO: 2,2'-bis[(2-hydroxyethoxy)phenyl]propane having a boiling point of approximately 480° C.
FG: fluorene glycol having a boiling point of approximately 370° C.
PCPDM: penta-cyclopentadecane dimethanol having a boiling point of approximately 420° C.
CHDM: cyclohexane-1,4-dimethanol having a boiling point of approximately 280° C.
DDM: decalin-2,6-dimethanol having a boiling point of approximately 341° C.

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Diol: Species | — | — | BPEF | — | BPEF | BPA | BPA | BD | NPG | NPG |
| Diol: Amount | | | | | | | | | | |
| (g) | — | — | 5.5 g | — | 5.5 g | 2.9 g | 2.9 g | 1.1 g | 1.3 g | 1.3 g |
| (mol)*1 | | | 0.25 mol | | 0.25 mol | 0.25 mol | 0.25 mol | 0.25 mol | 0.25 mol | 0.25 mol |
| Mw | 63,000 | 35,000 | 28,000 | 34,000 | 30,000 | 32,000 | 30,000 | 31,000 | 30,000 | 30,000 |
| Tg(° C.) | 154 | 147 | 143 | 147 | 145 | 147 | 145 | 141 | 142 | 142 |
| YI value | 2 | 1.3 | 2.2 | 1.2 | 2.1 | 1.8 | 1.6 | 1.8 | 1.8 | 1.7 |

*1The number of moles per mole of the total amount of the terminal groups of the aromatic polycarbonate
BD: 1,4-butanediol having a boiling point of 228° C.
NPG: neopentyl glycol having a boiling point of 211° C.

TABLE 3

|  | Ex. 10 | Ex. 11 | Ex. 12 | Ex. 13 |
|---|---|---|---|---|
| Diol: Species | BPEF | BPA-2EO | BP-2EO | FE |
| Diol: Amount | | | | |
| (g) | 11.0 g | 6.0 g | 1.01 g | 0.50 g |
| (mol)*1 | 0.50 mol | 0.38 mol | 0.50 mol | 0.25 mol |
| Mw | 60,000 | 61,000 | 60,000 | 63,000 |
| Tg(° C.) | 153 | 153 | 152 | 154 |
| YI value | 0.80 | 0.80 | 0.90 | 1.0 |

*1Same as in Tables 1 and 2.
FE: fluorene diethanol having a boiling point of approximately 410° C.

As shown in the above examples, the polycarbonate resins obtained by the process of the present invention were excellent in color having a low YI value. In addition, their Tg values were comparable with BPA homopolymer having the same level of molecular weight. This means that, using the process of the present invention, a polycarbonate resin having comparable properties with the highly polymerized BPA homopolymer which had been difficult to manufacture by the conventional melt polymerization can be obtained in a simple way by melt polymerization which is an excellent method in terms of safety and an environmental aspect.

INDUSTRIAL APPLICABILITY

According to the present invention, a process for producing highly polymerized aromatic polycarbonate under moderate conditions for a short processing time can be provided.

The invention claimed is:

1. A process for producing a highly polymerized aromatic polycarbonate resin which comprises a highly polymerizing process wherein aromatic polycarbonate is linked with an aliphatic diol compound having a boiling point of 240° C. or higher through a transesterification reaction in the presence of a transesterification catalyst under reduced pressure to increase the molecular weight.

2. The process according to claim 1, wherein said aliphatic diol compound is a compound represented by the following general formula (I):
[Chemical Formula 1]

$$HO-(CH_2)_n-Q-(CH_2)_n-OH \qquad (I)$$

wherein Q represents a hydrocarbon group having 6-40 carbon atoms which may contain aromatic rings and "n" represents an integer of 0-10 or "n" represents 1-10 in the case that Q contains no aliphatic hydrocarbon groups.

3. The process according to claim 2, wherein said aliphatic diol compound is any one of the compounds represented by the following general formulas (II)-(IV):
[Chemical Formula 2]

$$HO-(CH_2)_{n1}-Q_1-(CH_2)_{n1}-OH \qquad (II)$$

$$HO-(CH_2)_{n2}-Q_2-(CH_2)_{n2}-OH \qquad (III)$$

$$HO-(CH_2)_{n3}-Q_3-(CH_2)_{n3}-OH \qquad (IV)$$

wherein $Q_1$ in the above formula (II) represents a hydrocarbon group having 6-40 carbon atoms containing aromatic ring(s), n1 in the above formula (II) represents an integer of 1-10, $Q_2$ in the above formula (III) represents a straight-chain or branched hydrocarbon group having 6-40 carbon atoms which may contain heterocyclic ring(s), n2 in the above formula (III) represents an integer of 1-10, $Q_3$ in the above formula (IV) represents a cyclic hydrocarbon group having 6-40 carbon atoms and n3 in the above formula (IV) represents an integer of 0-10.

4. The process according to claim 3, wherein said aliphatic diol compound is a compound represented by the following general formula (II):
[Chemical Formula 3]

$$HO-(CH_2)_{n1}-Q_1-(CH_2)_{n1}-OH \quad (II)$$

wherein $Q_1$ represents a hydrocarbon group having 6-40 carbon atoms containing aromatic ring(s) and n1 represents an integer of 1-10.

5. The process according to claim 4, wherein said aliphatic diol compound is selected from the group consisting of 4,4'-bis(2-hydroxyethoxy)biphenyl, 2,2'-bis[(2-hydroxyethoxy)phenyl]propane, 9,9'-bis[4-(2-hydroxyethoxy)phenyl]fluorene, fluorene glycol and fluorene diethanol.

6. The process according to claim 1, wherein said aliphatic diol compound is added in the amount of 0.01 to 1.0 mole per mole of the total amount of the terminals of the aromatic polycarbonate before said transesterification reaction.

7. The process according to claim 1, wherein the aromatic polycarbonate before said transesterification reaction in the highly polymerizing process is at least partially end-capped.

8. The process according to claim 7, wherein the aromatic polycarbonate before said transesterification reaction is a terminally end-capped prepolymer obtained by reacting an aromatic dihydroxy compound with diester carbonate.

9. The process according to claim 7, wherein the aromatic polycarbonate before said transesterification reaction in the highly polymerizing process has the concentration of terminal hydroxy groups of 1,500 ppm or less.

10. The process according to claim 1, wherein the weight average molecular weight (Mw) of the highly polymerized aromatic polycarbonate resin after the transesterification reaction in the highly polymerizing process is increased by 5,000 or more compared to that of the aromatic polycarbonate before the transesterification reaction.

11. The process according to claim 1, wherein the weight average molecular weight (Mw) of the aromatic polycarbonate before the transesterification reaction in the highly polymerizing process is 5,000 to 60,000.

12. The process according to claim 1, wherein the transesterification reaction in the highly polymerizing process is carried out at a temperature ranging from 240° C. to 320° C. under reduced pressure.

13. The process according to claim 1, wherein the transesterification reaction in the highly polymerizing process is carried out at a reduced pressure ranging from 13 kPaA (100 torr) to 0.01 kPaA (0.01 torr).

14. The process according to claim 1, which comprises a prepolymer-producing process wherein a terminally end-capped prepolymer is produced by reacting an aromatic dihydroxy compound with diester carbonate and a highly polymerizing process wherein said terminally end-capped prepolymer is linked with an aliphatic diol compound having a boiling point of 240° C. or higher through a transesterification reaction in the presence of a transesterification catalyst under reduced pressure to increase the molecular weight.

15. A highly polymerized aromatic polycarbonate resin obtained by the process according to claim 1.

16. The highly polymerized aromatic polycarbonate resin according to claim 15, which has the weight average molecular weight (Mw) of 30,000-100,000.

* * * * *